Oct. 24, 1967   J. B. CATALDO ET AL   3,349,208
TOGGLE LEVER ACTUATED MANUALLY-OPERATED CIRCUIT CONTROLLER
Original Filed July 27, 1962   5 Sheets-Sheet 1

INVENTORS
JOHN B. CATALDO
ANDREW J. KRALIK
BY FRANK W. KUSSY
ROBERT W. THOMAS
OSTROLENK, FABER, GERB & SOFFEN
ATTORNEYS

Oct. 24, 1967  J. B. CATALDO ETAL  3,349,208
TOGGLE LEVER ACTUATED MANUALLY-OPERATED CIRCUIT CONTROLLER
Original Filed July 27, 1962  5 Sheets-Sheet 2

INVENTORS
JOHN B. CATALDO
ANDREW J. KRALIK
BY FRANK W. KUSSY
ROBERT W. THOMAS
OSTROLENK, FABER, GERB & SOFFEN
ATTORNEYS

Oct. 24, 1967　　　J. B. CATALDO ETAL　　　3,349,208
TOGGLE LEVER ACTUATED MANUALLY-OPERATED CIRCUIT CONTROLLER
Original Filed July 27, 1962　　　　　　　　　　5 Sheets-Sheet 3

INVENTORS
JOHN B. CATALDO
ANDREW J. KRALIK
BY　FRANK W. KUSSY
ROBERT W. THOMAS

OSTROLENK, FABER, GERB & SOFFEN
ATTORNEYS

Oct. 24, 1967 J. B. CATALDO ETAL 3,349,208
TOGGLE LEVER ACTUATED MANUALLY-OPERATED CIRCUIT CONTROLLER
Original Filed July 27, 1962 5 Sheets-Sheet 4

INVENTORS
JOHN B. CATALDO
ANDREW J. KRALIK
BY FRANK W. KUSSY
ROBERT W. THOMAS
OSTROLENK, FABER, GERB & SOFFEN
ATTORNEYS

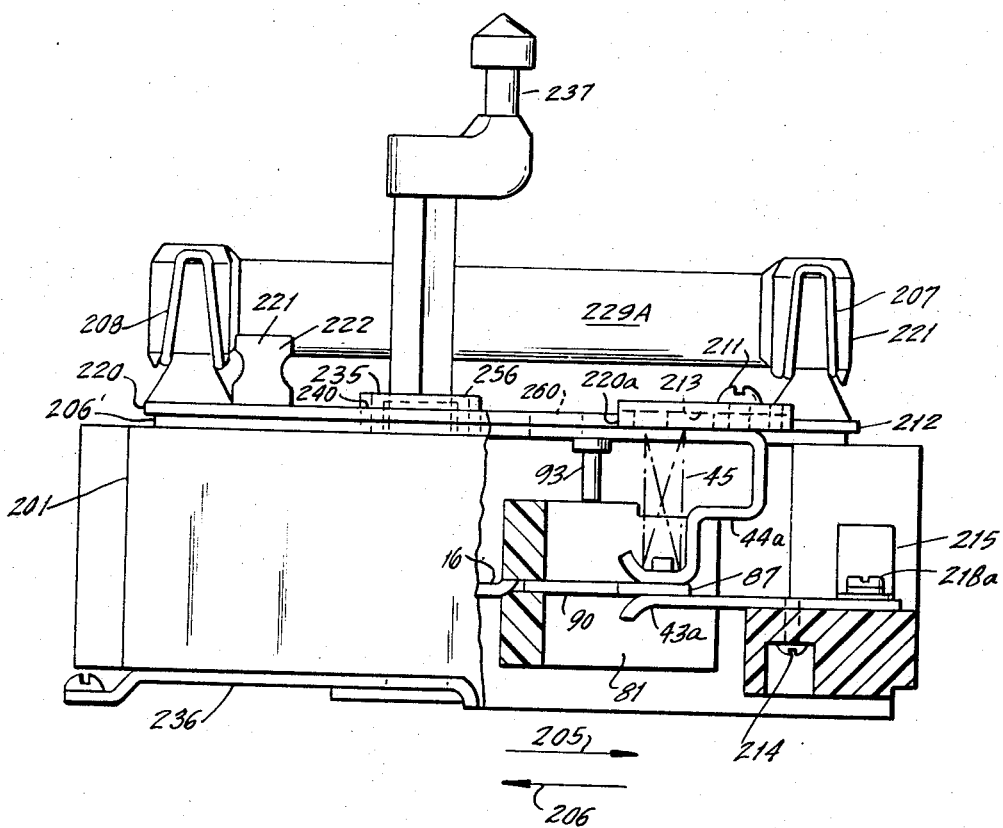
FIG_12_

United States Patent Office 3,349,208
Patented Oct. 24, 1967

3,349,208
TOGGLE LEVER ACTUATED MANUALLY-OPERATED CIRCUIT CONTROLLER
John B. Cataldo, Bloomfield Hills, Andrew J. Kralik, Detroit, Frank W. Kussy, Birmingham, and Robert W. Thomas, St. Clair Shores, Mich., assignors to I-T-E Circuit Breaker Company, Philadelphia, Pa., a corporation of Pennsylvania
Original application July 27, 1962, Ser. No. 212,890, now Patent No. 3,217,130, dated Nov. 9, 1965. Divided and this application Aug. 2, 1965, Ser. No. 487,950
8 Claims. (Cl. 200—153)

ABSTRACT OF THE DISCLOSURE

A toggle lever actuated manually-operated circuit controller comprising a stationary contact and a movable contact which is movable into and out of engagement with the stationary contact along a first path; a toggle assembly having a parallelogram configuration; the movable contact being attached to one link of the parallelogram; the opposite link of the parallelogram being translatable along a second path substantially perpendicular to the path of the movable contact; an over-center spring device for snapping the link moving along the second path into either the contact open or contact closed condition; a rotary arm and handle connected with the operating over-center spring for moving the same over-center in opposite directions; a second collapsible parallelogram having the link which travels the second path as one of its arms and having its link opposite the link travelling along the second path being mounted in a stationary fashion; the contact assembly alternatively comprising a plurality of movable contacts engageable with a plurality of stationary contacts, all of which are operated from a single toggle assembly.

This invention is a division of Ser. No. 212,890, filed July 27, 1962, now Patent 3,217,130 issued on Nov. 9, 1965, to the present inventor and assigned to the assignee of the present invention.

This invention relates to circuit interrupters and more particularly to circuit interrupters consisting of a novel vacuum switch and fuse assembly having a parallelogram linkage operating assembly for providing rapid, reliable contact opening and closing operations.

Double break switches of the prior art are comprised of a stationary contact pair having a reciprocating member slideably mounted therebetween. The reciprocating member consists of a conductive portion and an insulated portion wherein the conductive portion is positioned between the contact pair in the switch-closed position. The insulating portion moves to a position between the contact pair when the switch is operated to open circuit position. This arrangement thereby positions a member of high insulating value between the contact pair and further acts to prevent the accumulation of ionized gases in the region between the contact pair. The instant invention provides a switch assembly which minimizes the effect of ionizing gases and inhibits arcing by means of a novel contact pair and reciprocating member configuration which together with a novel operating mechanism provides rapid and complete current interruption.

The switch assembly of the invention is comprised of an operating means having a toggle assembly which forms a parallelogram configuration having a stationary and a free end. The free end is coupled to the contact assembly reciprocating member. High speed movement of the reciprocating member is produced by an over-center spring assembly positioned between a rotatable member and the toggle assembly.

Rotation of the rotatable member in a first direction moves the spring member to a first over-center position causing the contact assembly to move rapidly to its closed position. Rotation of the rotatable member in the reverse direction moves the spring member to a second over-center position rapidly moving the contact assembly to its open circuit position.

The contact pair is arranged so that one contact is relatively stationary and the second contact is relatively movable. A biasing member abuts the relatively movable contact providing high magnitude contact pressure in the contact assembly. The use of independent operating and contact pressure spring means enables the selection of spring means having dissimilar spring constants and further guarantees maintenance of contact pressure even if the operating spring means fails. The biasing spring mounting enables the contacts of the contact pair to be curved away from one another at their free ends each forming an arcing contact configuration to aid in the extinguishment of any electrical current arcs formed therebetween.

A retaining means is provided for restraining the free end of the toggle assembly during a portion of the closing operation. During this portion of the closing operation the over-center spring means is charged to a degree sufficient to insure high speed closing. Closing cam means engageable with the rotating member initiates the movement of the toggle assembly and further cooperates to disengage the toggle assembly from the retaining means. Positive cam means are also provided which when engaged by the rotatable member acts to initiate movement of the toggle assembly in the opening direction. This structure assists the over-center spring means in the opening operation and, in case of failure of the spring means or "welding" of the contact assembly, is designed to act as the sole means for moving the contact assembly to the fully open position.

In cases where circuit control for a multiphase system is desired, a unitary head is provided for mounting all of the reciprocating members. One end of the unitary head is coupled to the free end of the toggle assembly. The parallelogram arrangement of the toggle assembly assures uniform simultaneous movement of the plural contact assembly reciprocating members thereby preventing the occurrence of any single phasing. Since the toggle assembly experiences only translation and compression forces whereas prior art operating devices experience torsional forces during the closing and opening operations the instant invention insures simultaneous separation and engagement of the contact assemblies.

The switch housing is designed to compactly house the switch assembly. Guiding means are provided within the housing which cooperate with associated guide pins projecting from the unitary head for preventing the unitary switch head from experiencing any translational motion in directions transverse to the normal reciprocating motions.

Openings are positioned along the housing adjacent each contact assembly for observation of the condition, i.e., open or closed position of the contact assembly. In installations where dust, humidity and other such objectionable environmental factors are present each opening may be fitted with transparent inserts to protect the switch assembly while retaining the observation feature.

The rotatable member is designed to operate under control of either a centrally mounted or a side mounted manual operating handle means thus enabling the circuit interrupter to be mounted in a variety of different positions.

It is, therefore, one object of this invention to provide a novel toggle assembly for a circuit interrupter.

Another object of this invention is to provide a circuit interrupter having a novel toggle assembly which includes novel restraining means enabling the toggle spring actuating means to become charged to a degree sufficient to provide high speed closing operations.

Another object of this invention is to provide a toggle assembly for a circuit interrupter which includes novel cam means for initiating circuit interrupter closing and opening operations.

Still another object of this invention is to provide a stationary contact assembly for circuit interrupters having biasing means completely independent from the circuit interrupter spring actuating means.

Another object of this invention is to provide a novel spring biased stationary contact assembly having stationary contact members which are curved at their free ends in directions away from one another to provide a novel arcing contact configuration.

Still another object of this invention is to provide a novel contact assembly for circuit interrupters of the multi-phase type wherein a novel unitary head is employed for mounting the reciprocating members of each contact assembly to provide simultaneous uniform opening and closing operations.

Another object of this invention is to provide a novel toggle assembly operating means for a circuit interrupter which is arranged to accommodate either centrally or side mounted manual operating handles.

Still another object of this invention is to provide a movable contact arrangement for circuit interrupters having a unitary head means which is designed to cooperate with guide means provided in the interrupter housing to control the motion of the contact assembly reciprocating member.

Yet another object of this invention is to provide a movable contact arrangement for circuit interrupters having a reciprocating contact which is designed to cooperate with a contact assembly having a novel arrangement to enhance contact pressure between the reciprocating member and the cooperating contact assembly when the circuit interrupter is in its ON position.

Another object of this invention is to provide a toggle assembly operating means for circuit interrupters which is so designed as to experience no strain due to torsional forces during the opening and closing operations thereof.

These and other objects will become apparent upon reading the accompanying description and drawings in which:

FIGURE 12 is a cross-sectional view of a complete interrupter assembly in accordance with the instant invention.

Figure 1:
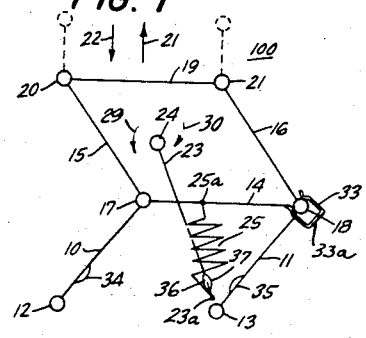
FIGURES 1 and 2 are schematic diagrams of the toggle assembly operating means of the instant invention showing the toggle assembly in the tripped position.

Referring now to the drawings and more particularly to FIGURES 1-7, the toggle assembly 100 of this invention is comprised of first and second links 10 and 11 which are mounted to the circuit interrupter housing (not shown), at pivot points 12 and 13 respectively. The free ends of links 10 and 11 are pivotally connected to a crossarm link 14 at pivot points 17 and 18 respectively. A second pair of links 15 and 16 are also connected at their first ends to the pivot points 17 and 18 respectively. Their opposite ends are pivotally connected to a second crossbar member 19 at pivot points 20 and 21 respectively. The crossarm 19 is mounted in a manner to be more fully described, such that the movement of crossarm 19 is restricted to either the upward or downward vertical direction, as shown by arrows 21 and 22 respectively.

Rotatable arm 23 is provided and is mounted to pivot about reference point 24 in either the clockwise or counterclockwise directions as shown by the arrows 29 and 30. The opposite end 23a of arm 23 is coupled to the first end of operating spring member 25 which has its second end 25a coupled to a point intermediate the ends 17 and 18 of crossbar 14.

Figure 2:
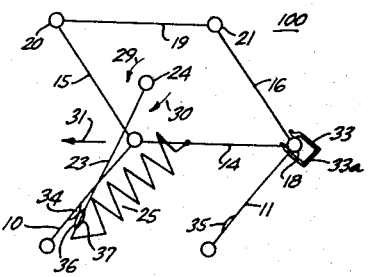

In order to move the crossarm 19 in the upward and downward vertical directions as shown by arrows 21 and 22 respectively the procedures are as follows:

Arm 23 is rotated (by means not shown) in the clockwise direction as shown by arrow 29 from the position shown in FIGURE 1 towards the position shown in FIGURE 2 causing the operating spring 25 to become charged. When the arm 23 has moved to the position shown in FIGURE 2 it makes slidable engagement with the link 10. The overcenter position of spring member 25 shown in FIGURE 2 causes the charged spring member 25 to urge the crossarm 14 in the direction shown by arrow 31. Thus the horizontal force component of the closing force generated by charged spring 25 moves the toggle assembly from the position shown in FIGURE 2 to that shown in FIGURE 3. Further movement in the direction of arrow 31 is restrained by the wall 32 which may for example be a portion of the circuit interrupter housing.

In order that the spring member 25 become charged to an amount sufficient to move crossarm 19 in the direction shown by arrow 21 at relatively high speeds, a restraining or clip means 33 is provided. The restraining means 33 is comprised of a substantially U-shaped member having arms which etxend inwardly at their free ends and having its central portion 33a mounted in any well known manner so as to be stationary. The extending arms of restraining means 33 engage the pin 18 mounted at the end of crossarm 14 when the toggle assembly is in the position shown in FIGURE 1. Even though the spring means 25 becomes charged in moving from the position shown in FIGURE 1 to that shown in FIGURE 2 the engagement of pin 18 by restraining means 33 prevents the movement of the toggle assembly 100 to the position shown in FIGURE 3. In order to initiate movement of the toggle assembly the rotatable arm 23 slidably engages the arm 10 causing the pin 18 of crossarm 14 to be disengaged from restraining means 33. As soon as this occurs spring member 25 being in fully charged condition rapidly urges the toggle assembly toward the position shown in FIGURE 3. Thus, it can be seen that the restraining means 33 restrains the movement of the toggle assembly 100 for a period sufficient to fully charge spring member 25.

Closing cam means 34 mounted upon link 10 cooperate with closing cam 36 mounted upon rotatable arm 23 in order initiate rotation of the link 10 and hence the entire toggle assembly 100 at the instant that spring means 25 achieves its fully charged condition.

Figure 3:
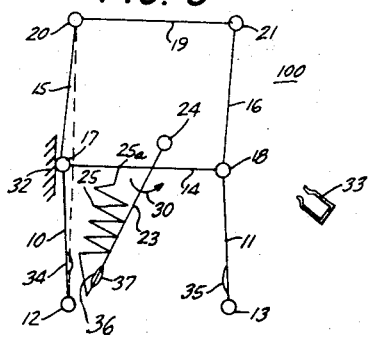
FIGURES 3 and 4 are schematic diagrams of the toggle assembly operating means of the instant invention showing the toggle assembly in the closed position.
Figure 4:
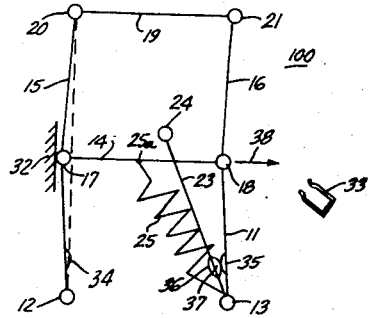

Operating toggle assembly from the position shown in FIGURE 3 to that shown in FIGURE 1 occurs as follows:

The rotatable arm 23 is moved counterclockwise as shown by arrow 30 towards the position shown in FIGURE 4. When the spring means 25 achieves the overcenter position shown in FIGURE 4 the horizontal force component of the total force exerted by spring means 25 upon crossarm 14 causes the crossarm 14 to move in the direction shown by arrow 38 until the toggle assembly assumes the position shown in FIGURE 1. It should be noted that the pin 18 becomes engaged by the restraining means 33 placing the toggle assembly in readiness for the next closing operation.

Initiating means for the opening operation is comprised of a tripping cam 35 mounted to link 11 and an associated tripping cam 37 mounted to arm 23 which cams are positioned so as to initiate the tripping operation at a time when spring means 25 is in the fully charged position. In addition thereto cam means 35 and 37 further enable toggle assembly 100 to be moved to the position shown in FIGURE 1 from that of FIGURE 4 under primary control of the manual force exerted by the operator upon rotatable arm 23. This may become necessary when the contact assembly has "welded" so that the tripping force of spring 25 alone is insufficient to break the weld and to move the contact assembly to the open position. Also in case of failure of operating spring member 25 due to breakage or for any other reason the toggle assembly 100 may be moved to the fully open position solely by means of the tripping cams 35 and 37.

Figure 5:
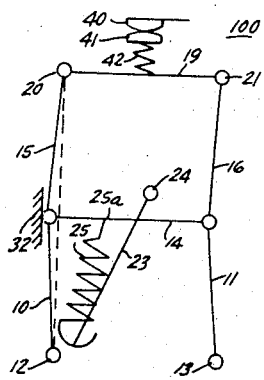
FIGURES 5 and 6 show the toggle assembly of FIGURES 1-4 employed for the actuation of two different contact assemblies.

The toggle assembly 100 may be cooperatively linked with a contact assembly such as for example that contact assembly of FIGURE 5 which is comprised of cooperating contacts 40 and 41. Contact 40 may for example be mounted in a stationary manner while contact 41 is resiliently mounted to crossarm 19 by means of spring member 42 positioned between crossarm 19 and contact 41. Thus when cooperating with the contact assembly of FIGURE 5 the position of the toggle assembly 100 shown in FIGURE 1 constitutes the fully open condition whereas the position shown in FIGURES 3 and 5 constitutes the fully closed position.

Figure 6:
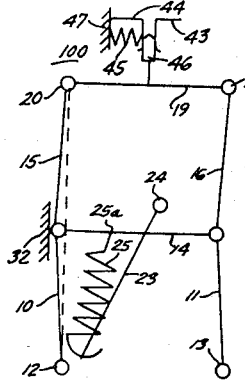

Another preferred embodiment of the contact assembly is shown in FIGURE 6 wherein the assembly is comprised of a stationary contact pair consisting of contacts 43 and 44. Contact 43 is mounted so as to be relatively stationary while contact 44 is mounted so as to be relatively movable. A biasing means 45 is positioned between contact 44 and a stationary reference point 47 urging contact 44 in a direction towards cooperating contact 43. A reciprocating contact 46 is provided which is linked at one end to a point intermediate the ends of crossarm 19 in such a manner that contact 46 slidably engages the interior faces of contacts 43 and 44 when toggle assembly 100 is in the position shown in FIGURE 6 and is removed from between contacts 43 and 44 when the toggle assembly 100 is in the position shown in FIGURE 1 of the drawings. This contact assembly is far superior to the assembly of FIGURE 5 since there is no dependence upon the magnitude of the force exerted by operating spring 25 in order to maintain sufficient contact pressure between the surfaces of the contact members so as to provide a safe and continuous current flow therethrough.

With the toggle assembly in the position shown in FIGURE 6 it should be noted that maintenance of the fully closed position of the contact assembly and of adequate contact pressure of the contact surfaces therein is completely independent of spring member 25. For example, assuming that the spring member 25, with the toggle assembly positioned as shown in FIGURE 6, fails due to breakage or any other reason, the force exerted by spring member 45 is sufficient to maintain the contact assembly in the fully closed position and simultaneously therewith to provide adequate contact pressure. Also, this arrangement enables the spring members 25 and 45 to be chosen completely independent of one another since there is no inter-dependence or relationship between the forces which are required to be exerted by these spring members. Thus spring member 25 need only have a spring constant of a value sufficient to provide rapid operation of toggle assembly 100 while spring member 45 may be chosen to provide a much greater force to maintain adequate contact pressure for the contact assembly.

Figure 8:
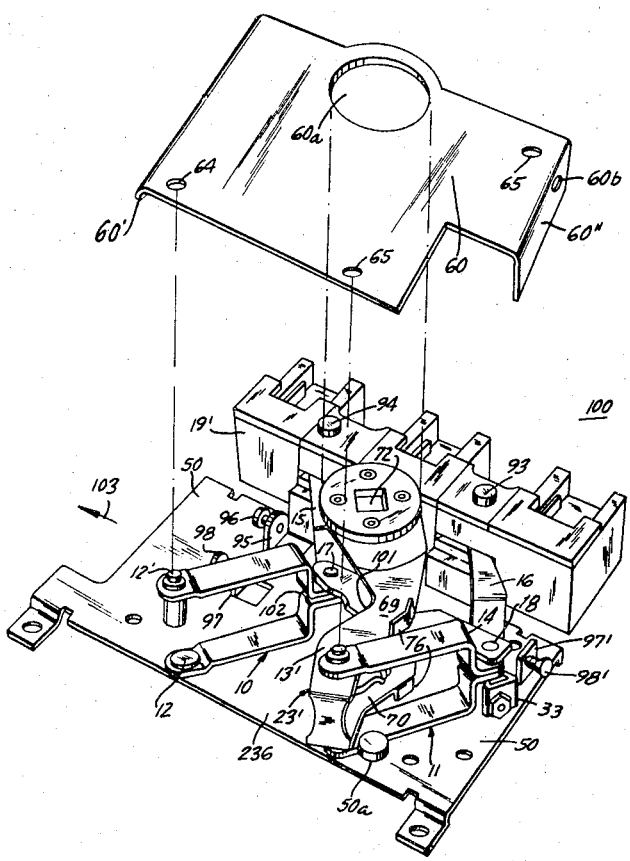
FIGURES 8 and 9 are perspective views of the toggle assembly of FIGURES 1-6 showing the toggle assembly in the fully tripped and fully closed positions respectively.
Figure 9:
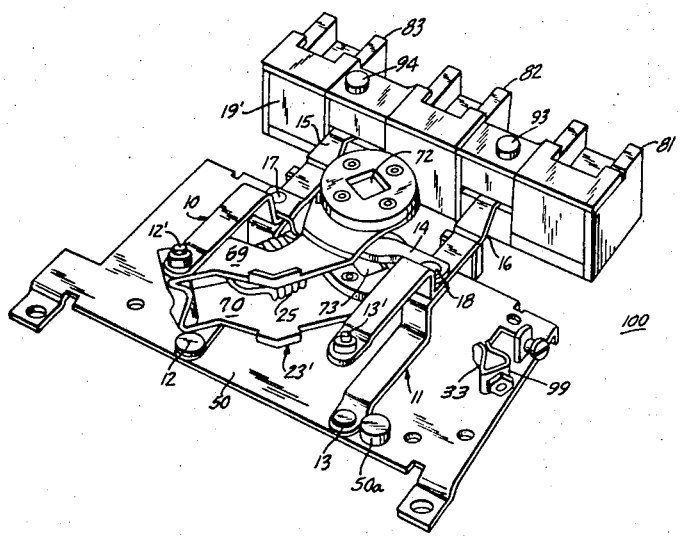

FIGURES 8 and 9 show the physical embodiment of the toggle assembly show schematically in FIGURES 1–6 wherein like elements are identified by like reference numerals. The toggle assembly 100 shown therein is comprised of a back plate 50 having links 10 and 11 pivotally mounted thereto by pivot pins 12 and 13 respectively. The links 10 and 11 are substantially U-shaped members having their opposite ends linked by means of pins 17 and 18 to crossbar 14. Pins 17 and 18 also pivotally mount the first ends of the links 15 and 16 which links have their opposite ends connected to a cross member assembly 19' which is the equivalent of the crossarm 19 shown in FIGURES 1–6. The bottom plate 50 together with a top or covering plate 60 provide the housing enclosures for the operating mechanism. The upper arms of the links 10 and 11 are pivotally mounted by means of pins 12' and 13' which engage the apertures 64 and 65, respectively, of the top or cover plate 60.

The rotating member 23' of FIGURES 8 and 9 is the mechanical equivalent of the arm 23 shown in FIGURES 1–6. The arm 23' is a substantially U-shaped member having the free ends of its extending arms 69 and 70 substantially circular in configuration and having rectangular apertures 72 and 73, respectively, positioned adjacent the ends of arms 69 and 70. These apertures 72 and 73 are provided for receiving manual operating arms in a manner to be more fully described.

Arms 69 and 70 are provided with flanges 76 which are the mechanical equivalent of the opening cam 37 shown in FIGURES 1–4. These flanges are positioned so as to abut the upper and lower arms, respectively, of the link 11. Hence, the arms of link 11 serve as the equivalent of the opening cam 35 of FIGURES 1–4. The operation of the toggle assembly under the control of the operating spring 25 is identical to the operation of the toggle assembly shown schematically in FIGURES 1–6.

Figure 7:
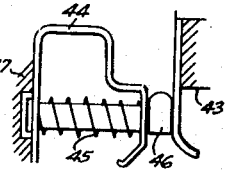
FIGURE 7 shows the contact structure of FIGURE 6 in greater detail.
Figure 10:
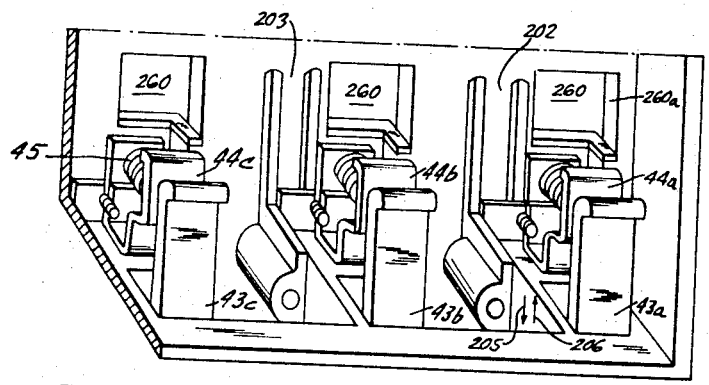
FIGURE 10 is a perspective view of an interior portion of the circuit interrupter showing the stationary contact assembly in greater detail.

The stationary contact structure shown in FIGURE 10 is identical to the structure shown schematically in FIGURE 7 described previously. This contact structure cooperates with the unitary mounting head structure 19' which can best be seen in FIGURES 8 and 9 and which is comprised of an elongated body 80 formed of an insulating material and having three extensions 81, 82 and 83 extending substantially perpendicular from the main body 80, each being formed integrally with the main body and each being formed of an insulating material. Each extension 81–83 is substantially rectangular and has a substantially rectangular cavity 84–86 respectively provided therein. A stationary insulating member 87, 88 and 89 is positioned in each cavity 84–86 respectively and is of such thickness as to be slidably engageable with the inner surfaces of the contact structure comprised of members 43a–c and 44a–c shown in FIGURE 10. Conductive members 90, 91 and 92 respectively are provided in the cavities 84–86 and are positioned so as to be substantially in alignment with their associated insulating guide members 87–89 respectively. The conductive members 90–92 are positioned immediately behind their associated insulating means 87–89 respectively so that each insulating member such as member 87 is substantially in alignment with its associated conductive member, such as for example the conductive member 90. The mounting head 19' is provided with grooves (not shown) which are so dimensioned as to permit some movement of the conductive members 90–92 in a direction transverse to their longitudinal axis. This arrangement enables conductive members 90–92 to become properly aligned between its associated contact pair when moved to the fully closed position as will be more fully described.

Unitary mounting head 19' further includes guide pins 93 and 94 for the purpose of cooperating with associated grooves (not shown) in the circuit interrupter housing to restrain the unitary mounting head 19' from any movement other than the reciprocating movement as described with respect to FIGURES 1–6.

The back plate 50 of toggle assembly 100 is provided with a flange 95 (FIGURE 8) having a tapped aperture for receiving a screw member 96. The screw member 96 acts as the fastening means for securing back plate 50 to cover plate 60. Screw member 96 threadedly engages a cooperating aperture (not shown) in flange 60'. Flange 60' acts as the stop means described with respect to FIGURES 1–6 and identified therein by numeral 32. A second and a third flange 97 and 97' each having an associated screw member 98 and 98' is provided for the very same purpose as screw member 96 so that with the toggle assembly 100 in its fully closed position, as shown in FIGURE 3 of the drawings, the right-hand end of screw member 96 threadedly engages an aperture in flange 60' and screw member 98' threadedly engages an aperture 60b in flange 60''.

A substantially U-shaped spring member 33 which can best be seen in FIGURES 8 and 9 is secured to base plate 50 so as to engage an extension of pin 18. The operation of this spring retaining means is identical to that described in connection with FIGURES 1 and 2 in which the toggle assembly 100 is maintained in the position shown in FIGURES 1 and 2 until cam means 36 engages cam means 34. The concave portion 101 of rotary member 23' is the cammed portion employed during the closing operation (equivalent to cam 36, FIGURES 1–4) which is arranged so as to engage the central portion or yoke 102 of arm 10 (which serves as the equivalent of cam 34 of FIGURES 1–4). At the time engagement occurs between concave portion 101 and central portion 102 operating spring 25 has been charged to its maximum. Further rotation (clockwise as viewed in FIGURE 8) of arm 23' thereby pushes the toggle assembly in the direction shown by arrow 103 of FIGURE 8 causing the pin 18 to become disengaged from the restraining member 99. The energy stored in spring member 25 is then employed at this time for the purpose of driving the toggle assembly to its fully closed position as shown in FIGURES 3 and 9.

Figure 11:
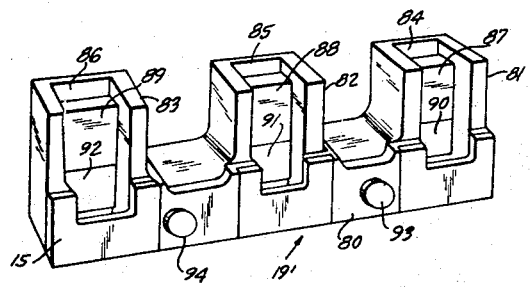
FIGURE 11 is an enlarged perspective view of the unitary head structure of FIGURES 8 and 9.

The circuit interrupter housing 200 can best be seen in FIGURE 12 and is comprised of a main shell 201 which is adapted to house the toggle assembly 100 shown in FIGURES 8 and 9. The toggle assembly is positioned in the housing shell 201 in such a manner that the pins 93 and 94 of the unitary mounting head (FIGURE 11) are guided by the elongated grooves 202 and 203 provided along the floor of housing shell 201. With this arrangement the unitary mounting head 19' is in close proximity with the stationary contact structure comprised of contact members 43a–c and 44a–c which can best be seen in FIGURE 10. In this position the insulating members such as for example the insulating member 84 is positioned between the surfaces of contact members 43 and 44 when the toggle assembly is in the fully open position. When the toggle assembly is moved to the fully closed position the guides 87–89 and conductors 90–92 of unitary mounting head 19' move in a direction shown by arrow 205 relative to the stationary contact structure causing the conductive members such as for example the conductive member 90 to be positioned between the opposing faces of the contact members 43a and 44a. This provides a conductive path between the stationary contact members 43 and 44 which are connected to load and line terminals respectively in a manner to be more fully described.

When the toggle assembly is moved from the fully closed position to the fully open position the unitary head moves in the direction shown by arrow 206 relative to the stationary contact assembly causing the conductive members such as the conductive member 90 to become disengaged from the opposing surfaces of contact members 43 and 44. The insulating members such as member 87 however, slide into a position directly between the opposing surface of contact members 43 and 44 so as to prevent the accumulation of ionized gases in the immediate region of the contact members 43 and 44 thereby preventing the occurrence of any restrike of the arc. The outwardly curved free ends of stationary contact members 43 and 44 act as arcing tips between which an arc travels when the switch is opened acting to stretch the length of the arc. This configuration substantially decreases burning in the portion where contact members are engaged by the conductive members 90–92 when the toggle assembly is in the fully closed position.

Upper surface 206' of housing assembly 200 is adapted to receive fuse holding assemblies which secure and electrically connect each fuse member with its associated double break contact structure. For further details concerning the fuse assemblies and fuses, see U.S. Patent No. 3,293,392 issued to the inventors hereof and assigned to the assignee hereof.

Aperture 235 is provided in the upper surface of the housing assembly which can best be seen in FIGURE 12. The aperture 235 provided in the housing upper surface 206' is adapted to receive the manual operating handle 237 shown in FIGURE 12. The operating handle portion 238 has a rectangular cross-sectiton adapted to engage the substantially rectangular openings 72 and 73 provided in the rotary arm 23' of the toggle assembly 100 (see FIGURE 9). Thus, toggle assembly 100 may be operated to its closed and open positions by rotation of the manual operating handle 237 in the appropriate directions. The manual operating handle main portion 238 (See FIG. 13) is provided with a flange 239 surrounding its periphery which cooperates with a shoulder 240 provided adjacent the aperture 235 in housing top surface 206, thus facilitating the proper positioning of manual operating handle 237.

Figure 13:
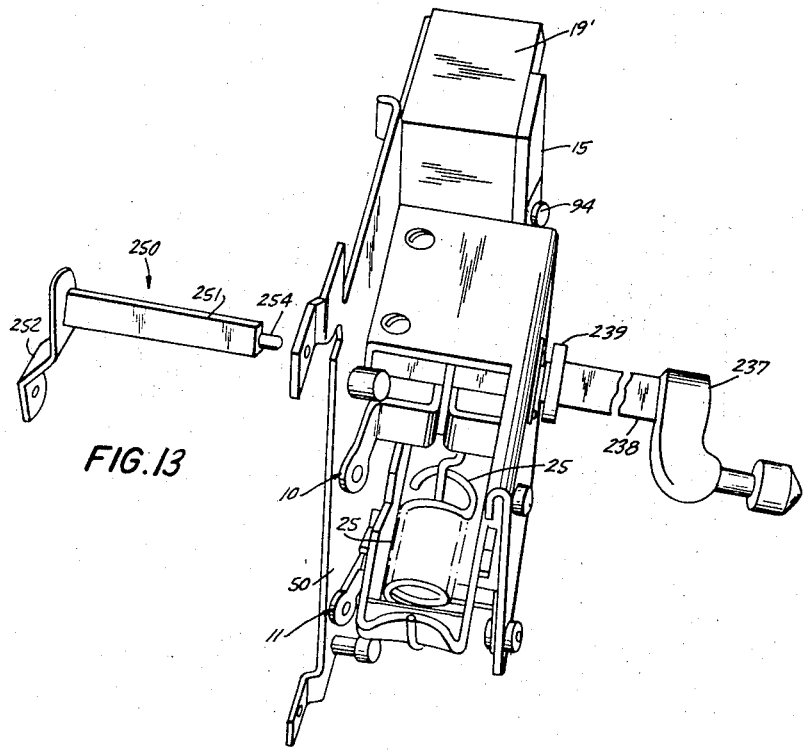
FIGURE 13 is an end view in perspective of the operating mechanism shown in FIGURES 8 and 9 showing the mounting of the alternative manual operating handles which may be employed with the circuit interrupter of this invention.

An alternative operating handle arrangement which may be employed is shown in FIG. 13 and is comprised of a handle assembly 250 having a body portion 251 and a rotating handle portion 252. The body portion 251 has a substantially rectangular cross-section which is adapted to engage the substantially rectangular apertures 72 and 73 of rotating member 23' which can best be seen in FIGURES 8 and 9. The length of the rotating handle portion is sufficient so as to extend to the side of the circuit interrupter assembly for ready access thereto. The main body portion 251 of side operated handle assembly 250 is held in position by means of a screw and washer which is mounted in the opening 235 (FIG. 12) of housing assembly upper surface 206' so that the bolt 256 rests on the shoulder 240 of opening 235 and is tapped so as to engage the screw portion 254 of main body portion 251. This arrangement therefore permits easily accessible side operation of the circuit interrupter assembly.

Openings 260 which can best be seen in FIGURES 10 and 12 are provided in the upper surface 206' of the housing assembly to permit observation of the contact assembly positioned immediately below each opening 260. In the fully closed position the contact members 43a–c and 44a–c are covered by the extending portions 81–83 of the unitary head means 19' (see FIGURE 11) and are therefore not visible at this time. When the toggle assembly is moved to the fully tripped or open position the contact members are observable in this position so as to permit a visual inspection for maintenance or other purposes. In situations where it is desired to cover the apertures 260 for protecting the circuit interrupter toggle assembly against dust, gases or other foreign matter, small insulating pieces having the same configuration as openings 260 may be snapped over the open areas and retained in this position by molded extensions 260a provided along the sides of each opening 260. If it is desired to prevent the introduction of such foreign matter while at the same time permitting observation of the contacts contained within the housing, the inserts employed may be formed of a transparent material.

An alternative contact arrangement for cooperating with the reciprocally mounted unitary head 19' and alternatives to head 19', can be seen in FIGURES 19–22 of U.S. Patent 3,217,130.

It can therefore be seen that this invention provides a novel circuit interrupter assembly having a toggle assembly of parallelogram configuration which insures rapid uniform closing and opening operations. While the preferred embodiment described herein is a multiphase circuit interrupter assembly, it should be understood that this invention operates equally as well with a greater or lesser number of phases and it is therefore not intended that the scope of the claims be limited to the preferred embodiment described above.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. An operating mechanism for use in circuit interrupters comprising a toggle assembly having a stationary first end; the free second end of said assembly being adapted to reciprocate between a closed and an open position; a contact assembly coupled to said toggle assembly free end; operating spring means connected to said toggle assembly to provide high speed movement of said toggle assembly during closing and opening operations; said toggle assembly having a collapsible parallelogram configuration.

2. An operating mechanism for use in circuit interrupters comprising a toggle assembly having a stationary first end; the free second end of said assembly being adapted to reciprocate between a closed and an open position; a contact assembly coupled to said toggle assembly free end; operating spring means connected to said toggle assembly to provide high speed movement of said toggle assembly during the closing and opening operations; said toggle assembly having a collapsible parallelogram configuration comprised of first and second links having their first ends pivoted a spaced distance apart to a stationary support; a third link having its first and second ends pivotally connected to the second ends of said first and second links respectively and adapted for reciprocating movement along a first path; at least one contact of said contact assembly being adapted for reciprocating movement along a second path substantially perpendicular to said first path.

3. An operating mechanism for use in circuit interrupters comprising a toggle assembly having a stationary first end; the free second end of said assembly being adapted to reciprocate between a closed and an open position; a contact assembly coupled to said toggle assembly free end; operating spring means connected to said toggle assembly to provide high speed movement of said toggle assembly during the closing and opening operations; said toggle assembly having a collapsible parallelogram configuration comprised of first and second links having their first ends pivoted a spaced distance apart to a stationary support; a third link having its first and second ends pivotally connected to the second ends of said first and second links respectively and adapted for reciprocating movement along a first path; at least one contact of said contact assembly being adapted for reciprocating movement along a second path substantially perpendicular to said first path; fourth and fifth links having their first ends pivotally connected to the first and second ends, respectively, of said third link; a crossbar member having its first and second ends pivotally connected to the second ends of said fourth and fifth links, respectively; said contact assembly being operatively connected to said crossbar member.

4. An operating mechanism for use in circuit interrupters comprising a toggle assembly which is stationary at a first end; the free second end of said assembly being adapted to reciprocate between a closed and an open position; a contact assembly coupled to said toggle assembly free end; operating spring means connected to said toggle assembly to provide high speed movement of said toggle assembly during the closing and opening operations; said toggle assembly having a collapsible parallelogram configuration comprised of first and second links having their first ends pivoted a spaced distance apart to a stationary support; a third link having its first and second ends pivotally connected to the second ends of said first and second links respectively and adapted for reciprocating movement along a first path; at least one contact of said contact assembly being adapted for reciprocating movement along a second path substantially perpendicular to said first path; fourth and fifth links having their first ends pivotally connected to the first and second ends, respectively, of said third link; a crossbar member having its first and second ends pivotally connected to the second ends of said fourth and fifth links, respectively; said contact assembly being operatively connected to a rotary arm pivotally connected at one end to said support and having its opposite end coupled to one end of said operating spring means; the opposite end of said operating spring means being coupled to a point intermediate the ends of said third link; said third link being adapted to experience reciprocating movement under control of said rotary arm; said rotary arm being adapted to rotate in both said first and second directions to control said circuit interrupter closing and opening operations.

5. An operating mechanism for use in circuit interrupters comprising a toggle assembly which is stationary at a first end; the free second end of said assembly being adapted to reciprocate between a closed and an open position; a contact assembly coupled to said toggle assembly free end; operating spring means connected to said toggle assembly during the closing and opening operations; said toggle assembly having a collapsible parallelogram configuration comprised of first and second links having their first ends pivoted a spaced distance apart to a stationary support; a third link having its first and second ends pivotally connected to the second ends of said first and second links, respectively, and adapted for reciprocating movement along a first path; at least one contact of said contact assembly being adapted for reciprocating movement along a second path substantially perpendicular to said first path; fourth and fifth links having their first ends pivotally connected to the first and second ends, respectively, of said third link; a crossbar member having its first and second ends pivotally connected to the second ends of said fourth and fifth links. respectively; said contact assembly being operatively connected to a point intermediate the ends of said crossbar member; a rotary arm pivotally connected at one end to said support and having its opposite end coupled to one end of said operating spring means; the opposite end of said operating spring means being coupled to a point intermediate the ends of said third link; said third link being adapted to experience reciprocating movement under control of said rotary arm; said rotary arm being adapted to rotate in both first and second directions to control said circuit interrupter closing and opening operations; said rotary arm, said third link and said operating spring forming an overcenter spring arrangement; said overcenter spring arrangement being adapted to impart translational movement to said third link in response to rotational movement of said rotary arm when said operating spring moves to an overcenter position.

6. An operating mechanism for use in circuit interrupters comprising a toggle assembly having a stationary first end; the free second end of said assembly being adapted to reciprocated between a closed and an open position; a contact assembly coupled to said toggle assembly free end; operating spring means connected to said toggle assembly to provide high speed movement of said toggle assembly during the closing and opening operations; said toggle assembly having a collapsible parallelogram configuration comprised of first and second links having their first ends pivoted a spaced distance apart to a stationary support; a rotary arm pivotally mounted to said support; first and second cam surfaces integral with said rotary arm and facing said first and second links respectively; third cam means mounted to said first link, said third cam means being adapted to slideably engage said first cam surface during the closing operation at a predetermined time after initiation of charging of said operating spring means in the closing direction.

7. An operating mechanism for use in circuit interrupters comprising a toggle assembly which is stationary at a first end; the free second end of said assembly being adapted to reciprocate between a closed and an open position; a contact assembly coupled to said toggle assembly free end; operating spring means connected to said toggle assembly to provide high speed movement of said toggle assembly during the closing and opening operations; said toggle assembly having a collapsible parallelogram configuration comprised of first and second links having their first ends pivoted a spaced distance apart to a stationary support; a rotary arm pivotally mounted to said support; first and second cam surfaces integral with said rotary arm and facing said first and second links respectively; said first link being adapted to slideably engage said first cam surface during the closing operation at a predetermined time after initiation of charging of said operating spring means in the closing direction; said second link adapted to slideably engage said second cam surface during the tripping operation at a predetermined time after initiation of charging of said operating spring means in the tripping directon.

8. An operating mechanism for use in circuit interrupters comprising a toggle assembly which is stationary at a first end; the free second end of said assembly being adapted to reciprocate between a closed and an open position; a contact assembly coupled to said toggle assembly free end; operating spring means connected to said toggle assembly to provide high speed movement of said toggle assembly during the closing and opening operations; said toggle assembly having a collapsible parallelogram configuration comprised of first and second links having their first ends pivoted a spaced distance apart to a stationary support; a rotary arm pivotally connected at one end to said support means and having its opposite end coupled to one end of said operating spring means; the opposite end of said operating spring being coupled to a point intermediate the free ends of said first and second links; said free ends being adapted to experience reciprocating movement under control of said rotary arm; said rotary arm being adapted to rotate in both clockwise and counterclockwise directions to control said circuit interrupter closing and opening operations; said rotary arm, said operating spring means forming an overcenter spring arrangement; said overcenter spring arrangement being adapted to impart translational movement to said free ends in response to rotational movement of said rotary arm when said operating spring moves to an overcenter position; said rotary arm having an aperture of predetermined configuration at its pivot point, a manual operating handle having a handle portion and a body portion, said body portion having a cross-section substantially similar to said rotary arm aperture for slideable engagement therewith, said handle portion being offset from said body portion to facilitate manual operation thereof.

References Cited
UNITED STATES PATENTS

| | | | |
|---|---|---|---|
| 847,520 | 3/1907 | Smythe et al. | 200—153.7 |
| 2,450,256 | 9/1948 | Rowe | 200—163 XR |

ROBERT S. MACON, *Primary Examiner.*

ROBERT K. SCHAEFER, *Examiner.*

H. BURKS, *Assistant Examiner.*